(12) United States Patent
Liu

(10) Patent No.: US 10,686,615 B2
(45) Date of Patent: Jun. 16, 2020

(54) INSTANT MESSAGING GROUP MANAGEMENT METHOD AND APPARATUS

(71) Applicant: Alibaba Group Holding Limited, George Town (KY)

(72) Inventor: Lindong Liu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/440,834

(22) Filed: Jun. 13, 2019

(65) Prior Publication Data

US 2019/0296928 A1  Sep. 26, 2019

Related U.S. Application Data

(63) Continuation of application No. PCT/CN2018/084229, filed on Apr. 24, 2018.

(30) Foreign Application Priority Data

Apr. 25, 2017  (CN) .......................... 2017 1 0273959

(51) Int. Cl.
| | | |
|---|---|---|
| *G06F 15/16* | (2006.01) | |
| *H04L 12/18* | (2006.01) | |
| *H04L 12/58* | (2006.01) | |

(52) U.S. Cl.
CPC ...... *H04L 12/1822* (2013.01); *H04L 12/1813* (2013.01); *H04L 51/04* (2013.01)

(58) Field of Classification Search
CPC ....... H04L 51/02; H04L 51/063; H04L 51/18; H04L 51/22; H04L 51/24; H04L 51/30;
(Continued)

(56) References Cited

U.S. PATENT DOCUMENTS

| | | | |
|---|---|---|---|
| 7,047,030 B2 | 5/2006 | Forsyth | |
| 7,937,364 B1* | 5/2011 | Chandrasekaran | ..... G06F 9/546 |
| | | | 707/609 |

(Continued)

FOREIGN PATENT DOCUMENTS

| | | |
|---|---|---|
| CN | 1662900 | 8/2005 |
| CN | 104301125 | 1/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Farzana B Huq
(74) *Attorney, Agent, or Firm* — Fish & Richardson P.C.

(57) ABSTRACT

A mandatory read message is determined by a server end from one or more group session messages in a temporary group of a number of temporary groups. A respective reading status associated with the mandatory read message is obtained by the server end for each group member of a plurality of group members in the temporary group. Whether a group dissolution condition is satisfied is determined by the server end and based on the respective reading status for each group member in the temporary group. In response to determining that the group dissolution condition is satisfied, the temporary group including deleting data associated with the temporary group is dissolved by the server end.

16 Claims, 7 Drawing Sheets

(58) Field of Classification Search
CPC ......... H04L 51/34; H04L 51/36; H04L 51/38; H04L 67/04; H04L 67/14; H04L 67/125; H04L 67/1095; H04L 67/16; H04L 67/18; H04L 67/26; H04L 67/42; H04L 69/10; H04L 69/324; H04L 69/326; H04L 69/329
USPC .......................................... 709/203, 205–206
See application file for complete search history.

(56) References Cited

U.S. PATENT DOCUMENTS

| | | | | |
|---|---|---|---|---|
| 2012/0231770 | A1* | 9/2012 | Clarke | H04L 51/34 455/414.1 |
| 2013/0151636 | A1* | 6/2013 | Majeti | H04L 51/04 709/206 |
| 2013/0229722 | A1* | 9/2013 | Vogel | G02B 21/04 359/858 |
| 2015/0249909 | A1* | 9/2015 | Dabbs, III | H04W 4/06 455/518 |
| 2015/0256796 | A1 | 9/2015 | Ma | |
| 2016/0072757 | A1* | 3/2016 | Tolley | G06Q 10/109 709/206 |

FOREIGN PATENT DOCUMENTS

| | | |
|---|---|---|
| CN | 105337839 | 2/2016 |
| CN | 106067861 | 11/2016 |
| CN | 106557376 | 4/2017 |
| CN | 107181602 | 9/2017 |
| EP | 2475138 | 7/2012 |
| TW | 200941984 | 10/2009 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/084229, dated Jul. 16, 2018, 10 pages (with partial English translation).

Extended European Search Report in European Application No. 18790640.9, dated Dec. 9, 2019, 7 pages.

PCT International Preliminary Report on Patentability in International Application No. PCT/CN2018/084229, dated Oct. 29, 2019, 10 pages (with English translation).

* cited by examiner

INSTANT MESSAGING GROUP MANAGEMENT METHOD AND APPARATUS

CROSS-REFERENCE TO RELATED APPLICATIONS

This application is a continuation of PCT Application No. PCT/CN2018/084229, filed on Apr. 24, 2018, which claims priority to Chinese Patent Application No. 201710273959.6, filed on Apr. 25, 2017, and each application is hereby incorporated by reference in its entirety.

TECHNICAL FIELD

The present application relates to the field of communications technologies, and in particular, to an instant messaging group management method and apparatus.

BACKGROUND

With extensive development of Internet technologies, instant messaging technologies bring much convenience to people's work and life. From the early ICQ and OICQ (widely used messaging tool QQ today) to the new generation of WeChat, Ding Talk, etc., the instant messaging technologies evolve towards a more user-friendly direction.

Most instant messaging supports group chat technologies in most cases. The group chat technology can allow users in the same group in real life to exchange and share information together, for example, a classmate group, and a company group. In a current group chat application, some simple multi-party chats often appear, for example, several colleagues are temporarily dragged to a group to talk about a key problem. However, such groups are not likely to be used subsequently. As a result, a server end needs to maintain many "zombie groups", complexity of group management is increased, and errors can easily occur.

SUMMARY

In view of this, the present application provides an instant messaging group management method and apparatus.

Specifically, the present application is implemented by using the following technical solutions.

An instant messaging group management method is provided, where the method includes: determining a mandatory read message in group session messages; determining whether a group dissolution condition is satisfied based on a reading status of the mandatory read message; and dissolving a group based on a predetermined policy if the group dissolution condition is satisfied.

An instant messaging group management apparatus is provided, where the apparatus includes: a mandatory read message determination unit, configured to determine a mandatory read message in group session messages; a condition determination unit, configured to determine whether a group dissolution condition is satisfied based on a reading status of the mandatory read message; and a group dissolution unit, configured to dissolve a group based on a predetermined policy if the group dissolution condition is satisfied.

It can be seen from the previous description that, in the present application, whether a group dissolution condition is satisfied can be determined based on a reading status of a mandatory read message in a group, and when the group dissolution condition is satisfied, the group is dissolved based on a predetermined policy, thereby dissolving a large quantity of "zombie groups", reducing complexity of group management, and releasing storage resources, processing resources, etc. at a server end.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described in the following example implementations do not represent all implementations consistent with the present application. On the contrary, the implementations are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present application to describe various types of information, the information is not limited to these terms. These terms are only used to differentiate information of the same type. For example, without departing from the scope of the present application, the first information also can be referred to as the second information, and similarly, the second information also can be referred to as the first information. Depending on the context, for example, the word "if" used here can be explained as "while", "when", or "in response to determining".

Figure 1:
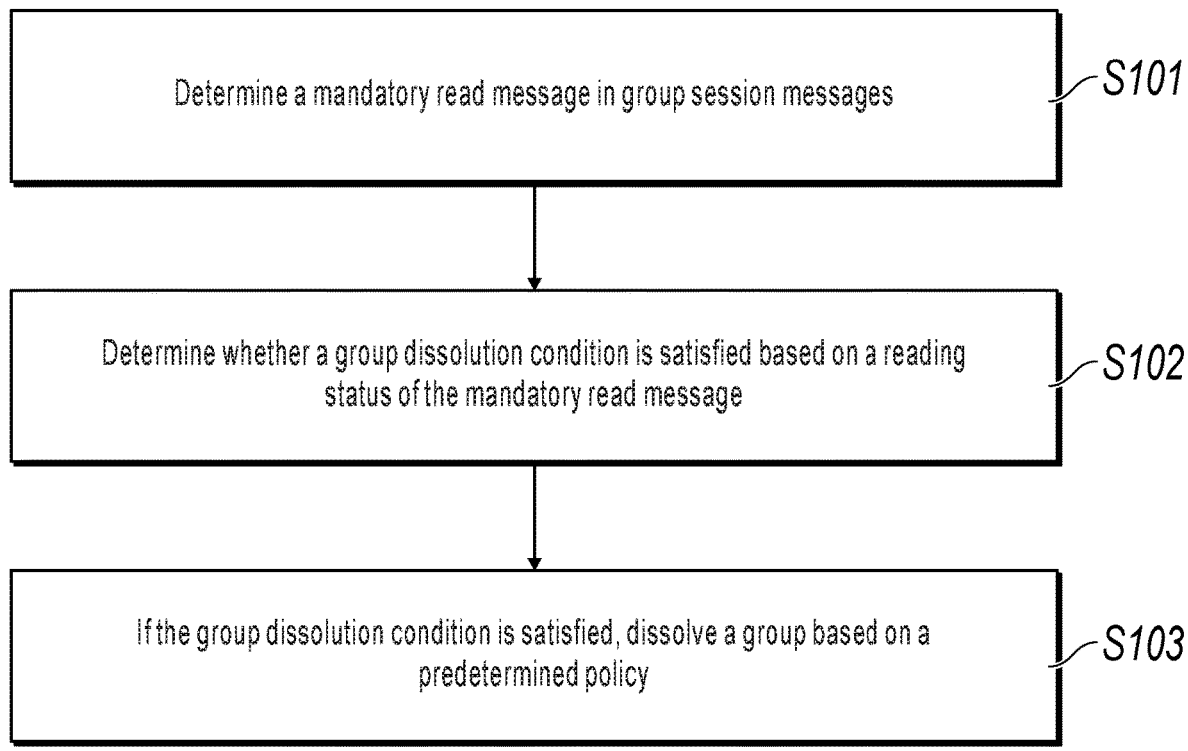
FIG. 1 is a schematic flowchart illustrating an instant messaging group management method, according to an example implementation of the present application.

FIG. 1 is a schematic flowchart illustrating an instant messaging group management method, according to an example implementation of the present application.

Referring to FIG. 1, the instant messaging group management method can be applied to an instant messaging server end, and includes the following steps.

Step 101: Determine a mandatory read message in group session messages.

In the present implementation, because many groups such as a "company group" and a "classmate group" are long-standing groups, and there is no need to dissolve these groups, a mandatory read message can be determined and a subsequent dissolution procedure can be performed for only a temporary group in the present application. When creating a group, a group creator can select a type of the group such as a "fixed group" or a "temporary group". In addition, for a created fixed group, a group owner or an administrator can also modify the type of the fixed group to a temporary group by using a setting option. Certainly, for a created temporary group, the group owner or the administrator can also modify the type of the temporary group to a fixed group by using a setting option.

Figure 2:
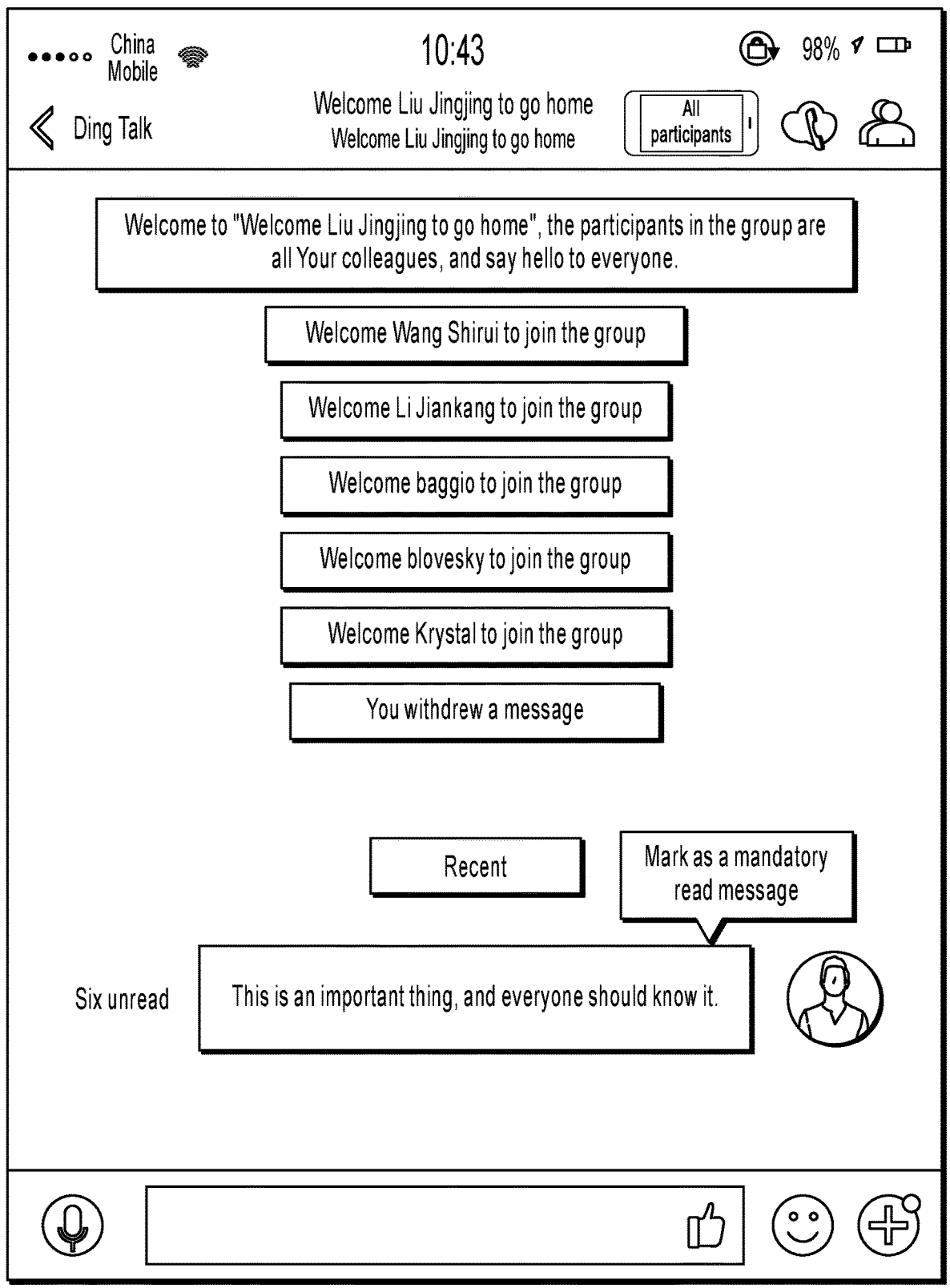
FIG. 2 is a schematic diagram illustrating a group session interface, according to an implementation of the present application.

In the present implementation, the mandatory read message is usually marked by an authorized group member such as a group owner or an administrator. Referring to an example in FIG. 2, after publishing a group session message by using client device, a group owner can trigger marking on a mandatory read message by using a tap operation, a double tap operation, a touch and hold operation, etc. For example, the group owner can mark a message that is expected to be read by all group members as the mandatory read message. After the group owner marks a message as the mandatory read message, the client device of the group owner can send the marking event to a server end. For example, a marking event that includes a group session message identifier can be sent to the server end, and the server end can determine a corresponding group session message as the mandatory read message based on the received marking event.

Certainly, in practice, the mandatory read message can also be marked in other ways. For example, after a group session message is edited, the group session message can be marked as the mandatory read message in a message editing box before being sent. As such, client device can send a mark of the mandatory read message to a server end together with the group session message, and there is no need to send a marking event subsequently. Implementations are not limited in the present application.

Step 102: Determine whether a group dissolution condition is satisfied based on a reading status of the mandatory read message.

In the present implementation, the server end can collect statistics about the reading status of the mandatory read message, and the reading status usually includes read or unread. The server end can detect a reading status of the mandatory read message by each group member, and then determine whether the group dissolution condition is satisfied based on the reading status of the mandatory read message in group members. The detection of the reading status can be implemented by using an implementation solution in related technologies. Details are omitted in the present application.

In the present implementation, the group dissolution condition can be a default condition, or can be personalized by the group owner or the administrator based on needs.

Step 103: If the group dissolution condition is satisfied, dissolve a group based on a predetermined policy.

It can be seen from the previous description that, in the present application, whether a group dissolution condition is satisfied can be determined based on a reading status of a mandatory read message in a group, and when the group dissolution condition is satisfied, the group is dissolved based on a predetermined policy, thereby dissolving a large quantity of "zombie groups", reducing complexity of group management, and releasing storage resources, processing resources, etc. at a server end.

The following describes an implementation process of the present application in detail by using a temporary group as an example.

In the present implementation, an authorized group member such as a group owner or an administrator can set an upper limit quantity of mandatory read messages based on needs. For example, assume that user A establishes a temporary group to publish an important message to group members, and user A can set the upper limit quantity of mandatory read messages to 1. After sending the important message, user A marks the important message as a mandatory read message. It is worthwhile to note that the upper limit quantity of mandatory read messages in the present application is not fixed. Before the temporary group is dissolved, user A can modify the upper limit quantity of mandatory read messages based on actual needs. Implementations are not limited in the present application.

In the present implementation, a server end can detect a reading status of the mandatory read message by each group member based on a marking event performed by user A.

For example, when determining that the mandatory read message is read by all the group members, the server end can determine that the temporary group satisfies a group dissolution condition, and can further dissolve the temporary group based on a predetermined policy.

For another example, when the server end determines that the mandatory read message is read by all the group members, and publishing duration of the mandatory read message reaches a first duration, the server end can determine that the temporary group satisfies a group dissolution condition, and can further dissolve the temporary group based on a predetermined policy. The first duration can be predetermined by user A, or can be a default value, for example, one day or three days. For example, the first duration is one day. When the server end determines that the mandatory read message is read by all the group members, and the publishing duration of the mandatory read message reaches 24 hours, the server end can dissolve the temporary group based on the predetermined policy. In such an implementation, before the publishing duration of the mandatory read message reaches the first duration, the group members can further perform related discussion in the temporary group, or user A can reset the upper limit quantity of mandatory read messages based on needs, so that implementation is more flexible, and user experience is better.

For another example, when the server end determines that the mandatory read message is not read by all the group members, but publishing duration of the mandatory read message reaches a second duration, the server end can determine that the temporary group satisfies a group dissolution condition, and can further dissolve the temporary group based on a predetermined policy. The second duration can be predetermined by user A, or can be a default value, for example, 15 days or 30 days. The second duration is usually longer than the first duration. For example, the second duration is 15 days. When the server end determines that the mandatory read message is not read by all the group members, but the publishing duration of the mandatory read message reaches 15 days, the server end can dissolve the temporary group based on the predetermined policy. In other words, when the publishing duration of the mandatory read message reaches 15 days, even if there is a group member who has not read the mandatory read message, the server end can also dissolve the temporary group based on the predetermined policy. In the present implementation, a problem that a temporary group cannot be dissolved because an individual group member does not read a mandatory read message can be effectively avoided.

For another example, when determining that a quantity of group members that read the mandatory read message accounts for a predetermined proportion, the server end can determine that the temporary group satisfies a group dissolution condition, and can further dissolve the temporary group based on a predetermined policy. The predetermined proportion also can be set by user A, for example, 80% or 90%. For example, assume that the temporary group includes a total of 10 group members. After determining that eight members read the mandatory read message, the server end can dissolve the temporary group based on the predetermined policy. In practice, such an implementation can also be combined with the first duration and the second duration, to obtain a determination criterion of the group dissolution condition.

For another example, if the upper limit quantity of mandatory read messages that is set by user A is a value greater than 1, when determining that a quantity of mandatory read messages in the temporary group reaches the upper limit quantity of mandatory read messages, the server end can determine whether a group dissolution condition is satisfied based on a reading status of all the mandatory read messages.

For example, assume that user A sets the upper limit quantity of mandatory read messages in the temporary group to 3. When determining that the quantity of mandatory read messages in the temporary group reaches three, the server end can perform determining based on the group dissolution condition. For example, if all the three mandatory read messages are read by all the group members, it can be determined that the temporary group satisfies the group dissolution condition. If all the three mandatory read messages are read by all the group members, and publishing duration of a mandatory read message with the latest publishing time reaches 24 hours, it can be determined that the temporary group satisfies the group dissolution condition. If at least one of the three mandatory read messages is not read by all the group members, and publishing duration of a mandatory read message with the latest publishing time reaches 15 days, it can be determined that the temporary group satisfies the group dissolution condition. Details are omitted in the present application.

In the present implementation, when it is determined that the previous temporary group satisfies the group dissolution condition, the group can be dissolved based on the predetermined policy. The predetermined policy can be set by a developer.

For example, the server end can immediately dissolve the temporary group.

Specifically, all stored information related to the temporary group such as a group identifier, information about the group members, and group session messages can be deleted.

Figure 3:
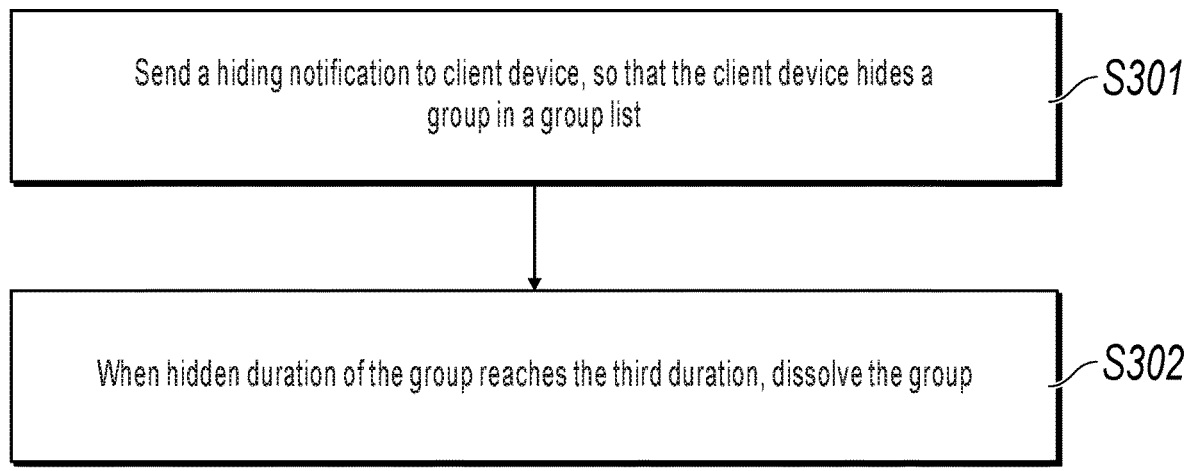
FIG. 3 is a schematic flowchart illustrating group dissolution performed based on a predetermined policy, according to an implementation of the present application.

For another example, a buffer time can be reserved for a user before the temporary group is dissolved. Referring to FIG. 3, the dissolving a group based on a predetermined policy can include the following steps.

Step 301: Send a hiding notification to client device, so that the client device hides the group in a group list.

In the present implementation, when determining that the previous temporary group satisfies the group dissolution condition, the server end can first send a hiding notification to the client device. After receiving the hiding notification, the client device can hide the temporary group in a group list. As such, a group member in the temporary group cannot see the temporary group in a group list, and interference to the user from the temporary group that is no longer used is avoided.

Step 302: When hidden duration of the group reaches the third duration, dissolve the group.

In the present implementation, the server end can dissolve the temporary group when determining that hidden duration of the temporary group reaches the third duration. The third duration can be set by a developer, for example, 20 days or 30 days.

For example, assume that the server end determines, at 18:00 on Mar. 1, 2017, that the previous temporary group satisfies the group dissolution condition, the server end can first send the hiding notification to client device of each group member in the temporary group, and the client device can hide the temporary group in a group list. For example, the third duration is 20 days, and the server end can dissolve the temporary group at 18:00 on Mar. 21, 2017.

Further, before the hidden duration of the temporary group reaches the third duration, if a query instruction is received from user A, client device of user A can be instructed to display the temporary group, and if it is determined that a new mandatory read message appears in the temporary group, dissolution of the temporary group is canceled.

The previous example is still used. Before 18:00 on Mar. 21, 2017, if user A still wants to publish a mandatory read message to the group members in the temporary group, user A can query the temporary group by using a query instruction. For example, user A can enter the group name of the temporary group for querying. The server end instructs the client device of user A to display the temporary group. Based on the identified temporary group, user A can send a mandatory read message again, and can further modify the upper limit quantity of mandatory read messages. For example, if the server end determines that a new mandatory read message appears in the temporary group, dissolution of the temporary group can be canceled. When a quantity of mandatory read messages in the temporary group reaches an upper limit quantity of mandatory read messages subsequently, it is determined whether the temporary group satisfies a group dissolution condition based on a reading status of all the mandatory read messages. Details are omitted in the present application.

In the present application, a certain buffer time can be reserved for a user before the group that satisfies the group dissolution condition is dissolved, so that flexibility is higher.

Corresponding to the previous implementation of the instant messaging group management method, the present application further provides an implementation of an instant messaging group management apparatus.

Figure 4:
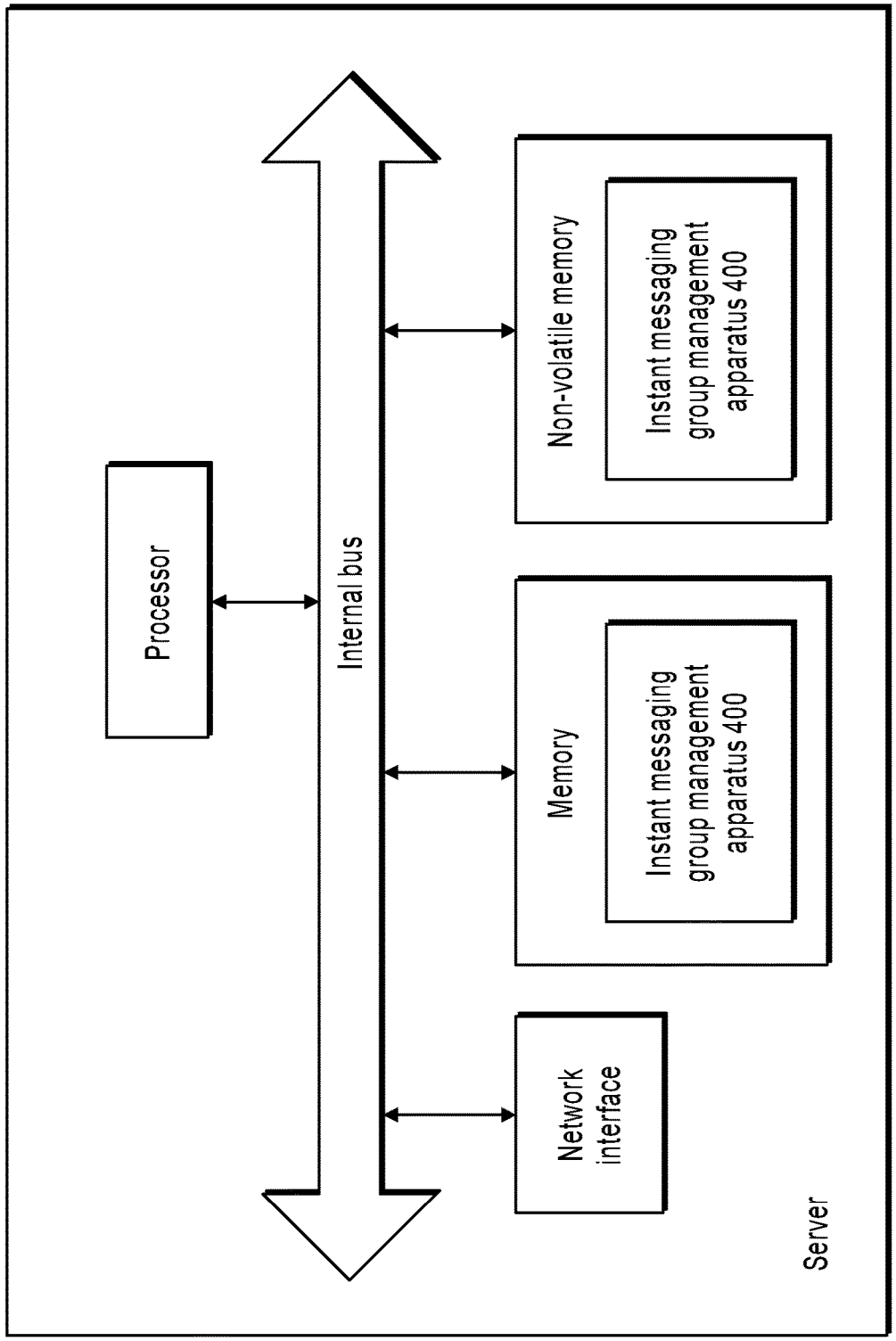
FIG. 4 is a structural diagram illustrating an instant messaging group management apparatus, according to an example implementation of the present application.

The implementation of the instant messaging group management apparatus in the present application can be applied to a server or a server cluster deployed by a service provider. The apparatus implementation can be implemented by software, hardware, or a combination of hardware and software. Software implementation is used as an example. As a logical apparatus, the apparatus is formed by reading a corresponding computer program instruction in a non-volatile memory and running the instruction in the memory by a processor in a server in which the apparatus is located. From a perspective of hardware, FIG. 4 is a structural diagram illustrating hardware of a server in which an instant messaging group management apparatus is located, according to the present application. In addition to a processor, a memory, a network interface, and a non-volatile memory shown in FIG. 4, the server in which the apparatus in the present implementation is located can usually include other hardware based on an actual function of the server. Details are not omitted here for simplicity.

Figure 5:
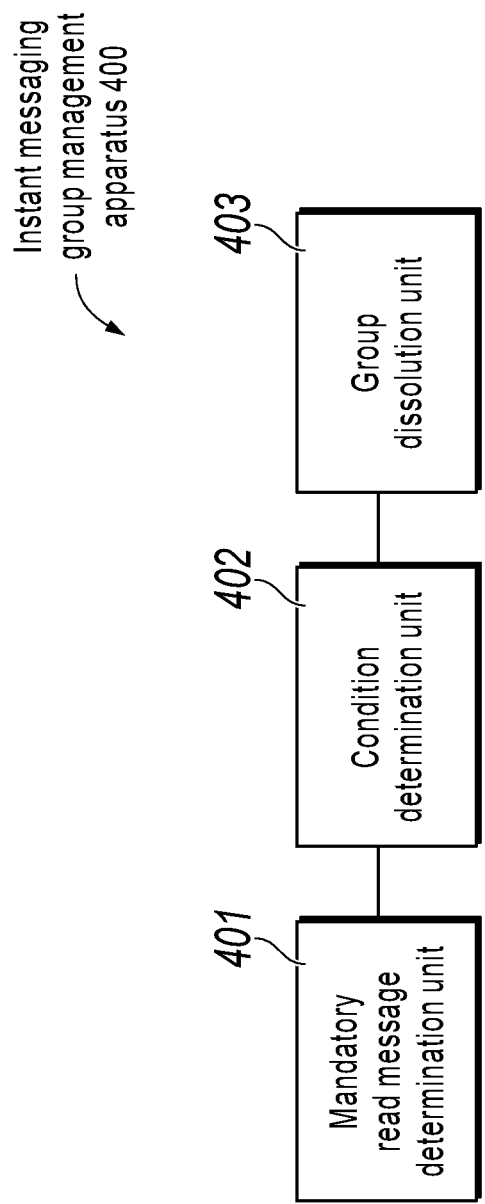
FIG. 5 is a block diagram illustrating an instant messaging group management apparatus, according to an example implementation of the present application.

FIG. 5 is a block diagram illustrating an instant messaging group management apparatus, according to an example implementation of the present application.

Referring to FIG. 5, the instant messaging group management apparatus 400 can be applied to the server shown in FIG. 4, and includes a mandatory read message determination unit 401, a condition determination unit 402, and a group dissolution unit 403.

The mandatory read message determination unit 401 is configured to determine a mandatory read message in group session messages.

The condition determination unit 402 is configured to determine whether a group dissolution condition is satisfied based on a reading status of the mandatory read message.

The group dissolution unit 403 is configured to dissolve a group based on a predetermined policy if the group dissolution condition is satisfied.

Optionally, the condition determination unit 402 is configured to determine that the group dissolution condition is satisfied when the mandatory read message is read by all group members.

Optionally, the condition determination unit 402 is configured to determine that the group dissolution condition is satisfied when the mandatory read message is read by all group members and publishing duration of the mandatory read message reaches the first duration.

Optionally, the condition determination unit 402 is configured to determine that the group dissolution condition is satisfied when the mandatory read message is not read by all group members but publishing duration of the mandatory read message reaches the second duration.

Optionally, the condition determination unit 402 is configured to determine that the group dissolution condition is satisfied when a quantity of group members that read the mandatory read message accounts for a predetermined proportion.

Optionally, the condition determination unit 402 is further configured to obtain a predetermined upper limit quantity of mandatory read messages, and determine whether the group dissolution condition is satisfied based on a reading status of all mandatory read messages when a quantity of mandatory read messages in the group session messages reaches the upper limit quantity of mandatory read messages.

Optionally, the upper limit quantity of mandatory read messages is set by a group owner or an administrator.

Optionally, the group dissolution unit 403 is configured to send a hiding notification to client device, so that the client device hides the group in a group list; and dissolve the group when hidden duration of the group reaches the third duration.

Optionally, the group dissolution unit 403 is further configured to instruct the client device to display the group if a query instruction is received from a group owner or an administrator before the hidden duration of the group reaches the third duration, and cancel dissolution of the group if it is determined that a new mandatory read message appears in the group.

Optionally, the group is a temporary group.

Optionally, the mandatory read message is marked by a group owner or an administrator.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, can be located in one position, or can be distributed on a plurality of network units. Some or all of the modules can be selected based on actual needs to achieve the objectives of the solutions in the present application. A person of ordinary skill in the art can understand and implement the implementations of the present application without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The previous descriptions are merely examples of implementations of the present application, but are not intended to limit the present application. Any modification, equivalent replacement, or improvement made without departing from the spirit and principle of the present application should fall within the protection scope of the present application.

Figure 6:
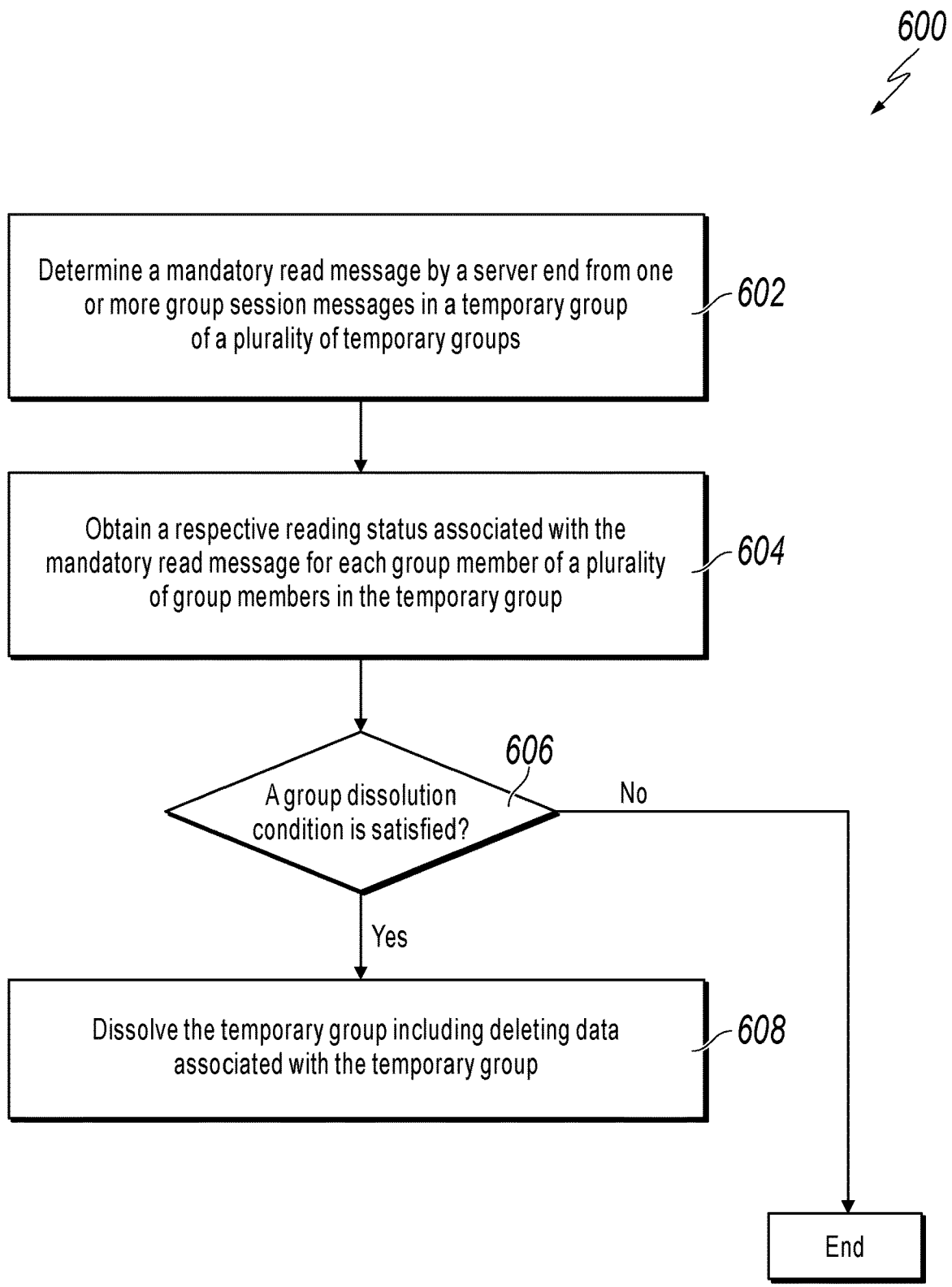
FIG. 6 is a flowchart illustrating an example of a computer-implemented method for managing an instant messaging group, according to an implementation of the present disclosure.

FIG. 6 is a flowchart illustrating an example of a computer-implemented method 600 for managing an instant messaging group, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a mandatory read message is determined by a server end from one or more group session messages in a temporary group of a number of temporary groups. After 602, method 600 proceeds to 604.

At 604, a respective reading status associated with the mandatory read message is obtained for each group member of a number of group members in the temporary group. After 604, method 600 proceeds to 606.

At 606, a determination is made as to whether a group dissolution condition is satisfied based on the respective reading status for each group member in the temporary group. If it is determined that the group dissolution condition is satisfied, method 600 proceeds to 608.

In some implementations, determining that the group dissolution condition is satisfied includes determining that each group member in the temporary group has read the mandatory read message, and determining that a publishing duration of the mandatory read message satisfies a first duration.

In some implementations, determining that the group dissolution condition is satisfied includes determining that at least one group member has not read the mandatory read message, and determining that a publishing duration of the mandatory read message satisfies a second duration.

In some implementations, determining that the group dissolution condition is satisfied includes determining that a quantity of group members that read the mandatory read message is at least a predetermined proportion of members in the group.

At 608, in response to determining that the group dissolution condition is satisfied, the temporary group including deleting data associated with the temporary group is dissolved by the server end.

In some implementations, dissolving the temporary group includes sending a hiding notification to a client device that instructs the client device to hide the temporary group in a group list comprising a plurality of group identifiers, and dissolving the temporary group whenever a hidden duration associated with the temporary group reaches a third duration.

In some implementations, method 600 further includes receiving a marking event from a client device, wherein the marking event includes a group session message identifier, and designating a group session message as the mandatory read message based on the received marking event.

In some implementations, method 600 further includes prior to determining that a group dissolution condition is satisfied based on the reading status of the mandatory read message, determining whether a quantity of mandatory read messages in the group session messages reaches an upper limit quantity of mandatory read messages.

In some implementations, method 600 further includes determining that the group dissolution condition is satisfied for a second temporary group of the plurality of groups; in response, sending a hiding notification to a client device that instructs the client device to hide the second temporary group in a group list including a plurality of group identifiers; receiving a query instruction from a group member that references the second temporary group that satisfies the group dissolution condition; and instructing the client device to display the second temporary group in response to receiving the query instruction from the group member that references the second temporary group.

In such implementations, method 600 further includes determining that a new mandatory read message has been submitted to the second temporary group; and in response, canceling a dissolution of the second temporary group. After 608, method 600 stops.

Figure 7:
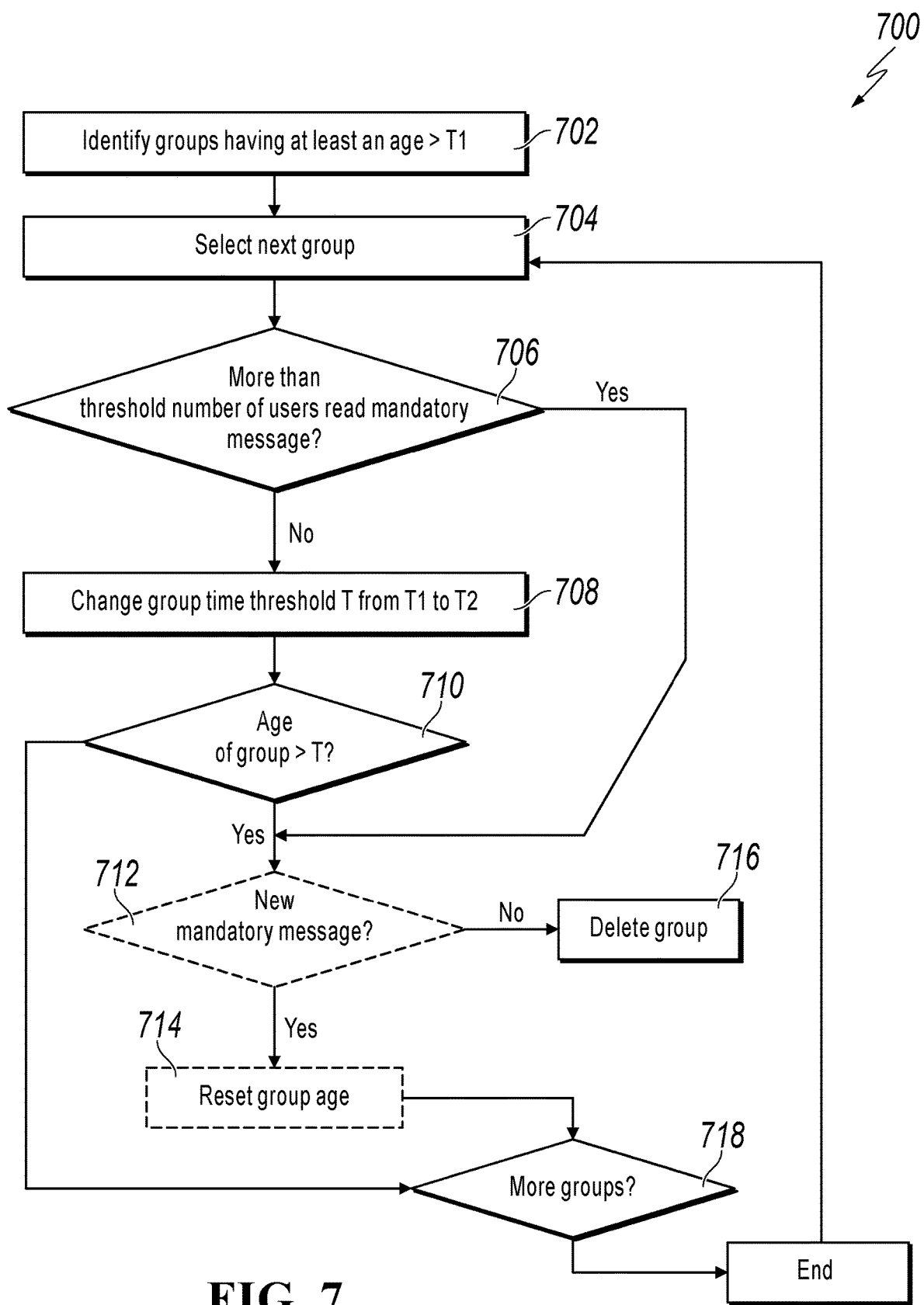
FIG. 7 is a flowchart illustrating an example of a computer-implemented method for processing each temporary group, according to an implementation of the present disclosure.

FIG. 7 is a flowchart illustrating an example of a computer-implemented method 700 for processing a temporary group, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a number of temporary groups having respective ages that are at least a first time threshold T1 are identified.

In some implementations, a temporary group can include a set of group members with their specific profile attributes such as, for example, display name, group identity, and membership. In some implementations, data associated with each temporary group, including information of group members, and chat session histories are stored at a server. The server maintains a list of temporary groups, which include both active and inactive temporary groups.

In some implementations, the list is sorted by the age T of each temporary group, where "age" refers to the length of time that the group has been created. In some implementations, each temporary group has a timestamp showing the time of creating the temporary group. In such implementations, the list is sorted by the timestamp of each temporary group.

In some implementations, the server can periodically, for example, every one day, every three days, or any time period determined by an authorized administrator of the temporary group, identify a number of temporary groups need to be processed.

In some implementations, identifying a number of temporary groups includes determining a group time threshold T1, and identifying a number of temporary groups that having a perspective age at least T1. For example, assume T1 is 10 days; because the list is sorted by the timestamp of each temporary groups, a temporary group which has a timestamp showing it has been created at least 10 days ago is identified. After 702, method 700 proceeds to 704.

At 704, a next temporary group is selected from the identified temporary groups.

In some implementations, among all the identified temporary groups having at least the age T1, a next temporary group is selected. In some implementations, the next temporary group can be a temporary group has the greatest age T among all identified temporary groups. In some implementations, the next temporary group can be a temporary group that includes the most group members, the most chat session history data, or otherwise occupies the most data storage space on the server. After 704, method 700 proceeds to 706.

At 706, a determination is made as to whether more than a threshold number of users read the mandatory message. In some implementations, the threshold number can be a number (for example, a number indicates only one member or two members have not read the mandatory message), or a ratio (for example, a ratio indicates more than 80% group members have read the mandatory message). In some implementations, the threshold number can be predetermined based on the importance or sensitivity of the mandatory message, based on the storage capacity of the server, or based on other policies.

If it is determined that more than threshold number of users read the mandatory message, method 700 proceeds to 712. Otherwise, if it is determined that less than threshold number of users read mandatory message, method 700 proceeds to 708.

At 708, the group time threshold of the temporary group is changed from T1 to T2 to obtain an updated group time threshold T. In some implementations, in cases where less than the threshold number of users read mandatory message, the server automatically changes the time threshold T1 to T2, where T2 is greater than T1. For example, T1 can be 10 days and T2 can be 15 days. By having a shorter T1, the system can save more storage space by aggressively pruning groups with an age of T1, while also increasing the chance that all group members will have read the mandatory message.

In some implementations, T2 can be determined by the number or the ratio of the group members have not read the mandatory message. For example, if a threshold number of users must read the mandatory message is 80%, a temporary group has only 20% group members have read the mandatory message can have a greater T2 than a temporary group has 60% group members have read the mandatory message.

In some implementations, T2 can be determined by the importance of the mandatory message. When the server determines a mandatory message, it can also assign a weight to each determined mandatory message to indicate its importance. The more important a message, a greater T2 the server adjusts for the temporary group to ensure more members in the group can read that message. After 708, method 700 proceeds to 710.

At 710, a determination is made as to whether the age T of the group is greater than the updated group time threshold T2. If it is determined that the age of the group is greater than the updated group threshold T2, method 700 proceeds to 712.

At 712, a determination is made as to whether a new mandatory read message has been submitted to the temporary group. In some implementations, the server gives the temporary group some "buffer time" before dissolving the temporary group. In such implementations, the server determines whether a new mandatory read message has been submitted to the temporary group during the buffer time.

If it is determined that a new mandatory message has been submitted to the temporary group, method 700 proceeds to 714. At 714, the age of the temporary group is reset. In some implementations, the servers can reset the age of the temporary group by resetting the timestamp of the temporary group to the moment the new message is submitted. In some implementations, the servers can reset the age of the temporary group by reducing the current age of the temporary group. After 714, method 700 proceeds to 718.

Returning to 710, if it is determined that the age of the group is less than the updated group threshold, method 700 proceeds 716. At 716, the temporary group is deleted. After 716, method 700 proceeds to 718.

At 718, a determination is made as to whether more groups are needed to be processed. If it is determined that more groups are needed, method 700 proceeds back to 704.

Implementations of the present application can solve technical problems in data management and processing for a temporary group. A temporary group, for example, a temporary chat group can be formed by dragging several people from a larger multi-party cha group. This type of temporary chat group can be used for a limited number of people to discuss key issues in a convenient and flexible way. However, a temporary chat group may not be needed anymore once a discussion is over. Traditionally, a server ends needs to maintain these temporary chat group even when they are no longer needed (so-called "zombie groups"), and there is no technology to optimize these zombie groups, resulting in a great number of invalid chat group residing in the server, increasing the complexity of chat group management, and leading to errors. What is needed is a technique to bypass these problems in the traditional method and to provide a more efficient and unified solution for managing the temporary group and processing data associated with the temporary group.

Implementations of the present application provide methods and apparatuses for automatically determining whether a temporary group needs to be dissolved and dissolving the temporary group when necessary. According to these implementations, after a mandatory read message is determined for the temporary group, whether a group dissolution condition is satisfied can be determined based on a reading status of the mandatory read message in the temporary group. If the group dissolution condition is satisfied, the group is dissolved based on a predetermined policy, thereby dissolving a large quantity of "zombie groups", reducing the complexity of group data management, and releasing data storage resources, data processing resources, etc. at a server end. Moreover, in the case where the group dissolution condition is not satisfied, the server can further process the group data by adjusting a group time threshold of the temporary group. The group time threshold can be determined and adjusted based on the type of temporary group, the importance of the mandatory read message. It can also be determined and adjusted based on the data processing and storage capacity of each individual server, therefore, the data processing speed and the storage capacity of the server can be further optimized.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    determining, by a server end, a mandatory read message from one or more group session messages in a temporary group of a plurality of temporary groups;
    obtaining, by the server end, a respective reading status associated with the mandatory read message for each group member of a plurality of group members in the temporary group;
    determining that a quantity of mandatory read messages in the group session messages reaches an upper limit quantity of mandatory read messages;
    in response, determining, by the server end, that a group dissolution condition is satisfied based on the respective reading status for each group member in the temporary group, including:
        determining that at least one group member in the temporary group has not read the mandatory read message,
        in response, increasing a group dissolution duration for the temporary group, and determining that a publishing duration of the mandatory read message is greater than the increased group dissolution duration; and
    in response to determining that the group dissolution condition is satisfied, dissolving, by the server end, the temporary group having the unread mandatory read message including deleting data associated with the temporary group.

2. The computer-implemented method of claim 1, further comprising:
    receiving a marking event from a client device, wherein the marking event includes a group session message identifier; and
    designating a group session message as the mandatory read message based on the received marking event.

3. The computer-implemented method of claim 1, wherein determining that the group dissolution condition is satisfied comprises:
 determining that each group member in the temporary group has read the mandatory read message; and
 determining that a publishing duration of the mandatory read message satisfies a first duration.

4. The computer-implemented method of claim 1, wherein determining that the group dissolution condition is satisfied comprises determining that a quantity of group members that read the mandatory read message is at least a predetermined proportion of members in the temporary group.

5. The computer-implemented method of claim 1, wherein dissolving the temporary group comprises:
 sending a hiding notification to a client device that instructs the client device to hide the temporary group in a group list comprising a plurality of group identifiers; and
 dissolving the temporary group whenever a hidden duration associated with the temporary group reaches a third duration.

6. The computer-implemented method of claim 1, further comprising:
 determining that the group dissolution condition is satisfied for a second temporary group of the plurality of temporary groups;
 in response, sending a hiding notification to a client device that instructs the client device to hide the second temporary group in a group list comprising a plurality of group identifiers;
 receiving a query instruction from a group member that references the second temporary group that satisfies the group dissolution condition; and
 instructing the client device to display the second temporary group in response to receiving the query instruction from the group member that references the second temporary group.

7. The computer-implemented method of claim 6, further comprising:
 determining that a new mandatory read message has been submitted to the second temporary group; and
 in response, canceling a dissolution of the second temporary group.

8. The computer-implemented method of claim 1, further comprising:
 prior to determining a mandatory read message from one or more group session messages in a temporary group of a plurality of temporary groups:
  identifying a plurality of temporary groups having respective ages that are at least T1; and
  selecting a temporary group from the plurality of temporary groups, wherein a group time threshold T of the temporary group is T1.

9. The computer-implemented method of claim 8, wherein determining, by the server end, that a group dissolution condition is satisfied comprises:
 determining whether at least a threshold number of group members in the temporary group have read the mandatory read message;
 whenever less than the threshold number of group members have read the mandatory read message, changing the group time threshold T of the temporary group from T1 to T2 to obtain an updated group time threshold T; and
 determining whether an age of the temporary group is greater than the updated group time threshold T.

10. The computer-implemented method of claim 9, further comprising:
 in response to a determination that the age of the temporary group is greater than the updated group time threshold T, determining whether a new mandatory read message has been submitted to the temporary group;
 in response to a determination that the new mandatory read message has been submitted to the temporary group, resetting the age of the temporary group to be less than T1; and
 in response to a determination that no new mandatory read message has been submitted to the temporary group, dissolving the temporary group.

11. A non-transitory, computer-readable medium storing one or more instructions executable by a computer system to perform operations comprising:
 determining, by a server end, a mandatory read message from one or more group session messages in a temporary group of a plurality of temporary groups;
 obtaining, by the server end, a respective reading status associated with the mandatory read message for each group member of a plurality of group members in the temporary group;
 determining that a quantity of mandatory read messages in the group session messages reaches an upper limit quantity of mandatory read messages;
 in response, determining, by the server end, that a group dissolution condition is satisfied based on the respective reading status for each group member in the temporary group, including:
  determining that at least one group member in the temporary group has not read the mandatory read message,
  in response, increasing a group dissolution duration for the temporary group, and
  determining that a publishing duration of the mandatory read message is greater than the increased group dissolution duration; and
 in response to determining that the group dissolution condition is satisfied, dissolving, by the server end, the temporary group having the unread mandatory read message including deleting data associated with the temporary group.

12. The non-transitory, computer-readable medium of claim 11, further comprising:
 receiving a marking event from a client device, wherein the marking event includes a group session message identifier; and
 designating a group session message as the mandatory read message based on the received marking event.

13. The non-transitory, computer-readable medium of claim 11, wherein determining that the group dissolution condition is satisfied comprises:
 determining that each group member in the temporary group has read the mandatory read message; and
 determining that a publishing duration of the mandatory read message satisfies a first duration.

14. A computer-implemented system, comprising:
 one or more computers; and
 one or more computer memory devices interoperably coupled with the one or more computers and having tangible, non-transitory, machine-readable media storing one or more instructions that, when executed by the one or more computers, perform one or more operations comprising:

determining, by a server end, a mandatory read message from one or more group session messages in a temporary group of a plurality of temporary groups;

obtaining, by the server end, a respective reading status associated with the mandatory read message for each group member of a plurality of group members in the temporary group;

determining that a quantity of mandatory read messages in the group session messages reaches an upper limit quantity of mandatory read messages;

in response, determining, by the server end, that a group dissolution condition is satisfied based on the respective reading status for each group member in the temporary group, including:

determining that at least one group member in the temporary group has not read the mandatory read message, in response, increasing a group dissolution duration for the temporary group, and determining that a publishing duration of the mandatory read message is greater than the increased group dissolution duration; and in response to determining that the group dissolution condition is satisfied, dissolving, by the server end, the temporary group having the unread mandatory read message including deleting data associated with the temporary group.

15. The computer-implemented system of claim 14, further comprising:

receiving a marking event from a client device, wherein the marking event includes a group session message identifier; and designating a group session message as the mandatory read message based on the received marking event.

16. The computer-implemented system of claim 14, wherein determining that the group dissolution condition is satisfied comprises:

determining that each group member in the temporary group has read the mandatory read message; and determining that a publishing duration of the mandatory read message satisfies a first duration.

\* \* \* \* \*